(12) United States Patent
Monsen et al.

(10) Patent No.: US 7,043,553 B2
(45) Date of Patent: May 9, 2006

(54) METHOD AND APPARATUS FOR SECURING INFORMATION ACCESS

(75) Inventors: Robert Charles Monsen, Castro Valley, CA (US); Sudhakar Mamillapalli, Santa Clara, CA (US); Xiaoyi Liu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/414,995

(22) Filed: Oct. 7, 1999

(65) Prior Publication Data

US 2003/0050962 A1    Mar. 13, 2003

(51) Int. Cl.
*G06F 15/16* (2006.01)

(52) U.S. Cl. ............... 709/229; 709/216; 709/225; 709/246; 707/8; 707/9; 707/10; 710/36; 711/147; 711/164; 713/165; 713/166; 713/202

(58) Field of Classification Search ........... 713/202, 713/165, 166; 709/216, 225, 229, 246; 711/147, 164; 710/36; 707/8, 9, 10

See application file for complete search history.

(56) References Cited

U.S. PATENT DOCUMENTS

| | | | |
|---|---|---|---|
| 4,776,038 A * | 10/1988 | Testin et al. | |
| 4,962,532 A | 10/1990 | Kasiraj et al. | 380/25 |
| 4,984,272 A * | 1/1991 | McIlroy et al. | 713/200 |
| 5,003,595 A | 3/1991 | Collins et al. | 380/25 |
| 5,033,076 A | 7/1991 | Jones et al. | 379/67 |
| 5,144,659 A * | 9/1992 | Jones | 713/165 |
| 5,163,147 A | 11/1992 | Orita | 395/600 |

(Continued)

FOREIGN PATENT DOCUMENTS

WO    99/53408    4/1999

OTHER PUBLICATIONS

Alexander, S., "DHCP Options and BOOTP Vendor Extensions," Network Working Group, RFC 1533. Oct. 1993.

(Continued)

*Primary Examiner*—Saleh Najjar
*Assistant Examiner*—Michael Y. Won
(74) *Attorney, Agent, or Firm*—Thelen Reid & Priest LLP; Marc S. Hanish (57) ABSTRACT

A method and apparatus for protecting secured files stored on a file system employs a file security status associated with each file to signal whether or not access to the file is allowed. The file security status is stored in a fixed location in memory. Upon opening the associated file, the file security status is copied to a second location in memory. Depending upon the file security status stored in the second location, operations on the file by a client are either allowed or denied. Operations on non-secure files are always allowed. Operations on secured files are allowed only after verification of the client's authorization to access the file and the subsequent modification of the file security status stored in the second memory location. The method protects secured files from deletion by unauthorized clients. This is accomplished by, upon opening a secure file, initializing a third memory location to a value indicating that the file will not be deleted upon closing. This value may be changed by an authorized client only after going through the above-described verification process. Once the value has been changed to reflect that the file should be deleted when closed, the file will be deleted when closed. A method for creating a new secure file is also provided.

13 Claims, 5 Drawing Sheets

U.S. PATENT DOCUMENTS

| | | | |
|---|---|---|---|
| 5,241,594 A | 8/1993 | Kung | 380/4 |
| 5,241,599 A | 8/1993 | Bellovin et al. | 380/21 |
| 5,351,136 A | 9/1994 | Wu et al. | 358/440 |
| 5,416,842 A | 5/1995 | Aziz | 380/30 |
| 5,421,006 A | 5/1995 | Jablon et al. | 395/575 |
| 5,440,635 A | 8/1995 | Bellovin et al. | 380/25 |
| 5,519,507 A * | 5/1996 | Subramaniam et al. | |
| 5,655,077 A | 8/1997 | Jones et al. | 395/187.01 |
| 5,671,354 A | 9/1997 | Ito et al. | 395/187 |
| 5,680,461 A | 10/1997 | McManis | 380/25 |
| 5,684,950 A | 11/1997 | Dare et al. | 395/187.01 |
| 5,708,780 A | 1/1998 | Levergood et al. | 395/200.12 |
| 5,764,772 A | 6/1998 | Kaufman et al. | 380/30 |
| 5,793,763 A | 8/1998 | Mayes et al. | 370/389 |
| 5,815,665 A | 9/1998 | Teper et al. | 395/200 |
| 5,835,727 A | 11/1998 | Wong et al. | 395/200.68 |
| 5,845,070 A | 12/1998 | Ikudome | 395/187.01 |
| 5,862,346 A * | 1/1999 | Kley et al. | 709/245 |
| 5,898,780 A | 4/1999 | Liu et al. | 380/25 |
| 5,933,625 A | 8/1999 | Sugiyama | 395/557 |
| 5,944,824 A | 8/1999 | He | 713/201 |
| 5,958,016 A | 9/1999 | Chang et al. | 709/229 |
| 5,987,123 A * | 11/1999 | Scott et al. | |
| 5,987,232 A | 11/1999 | Tabuki | 395/187 |
| 5,991,810 A | 11/1999 | Shapiro et al. | 709/229 |
| 5,999,978 A * | 12/1999 | Angal et al. | 709/229 |
| 6,006,334 A | 12/1999 | Nguyen et al. | 713/202 |
| 6,011,910 A | 1/2000 | Chau et al. | 395/200 |
| 6,021,496 A | 2/2000 | Dutcher et al. | 713/202 |
| 6,044,155 A | 3/2000 | Thomlinson et al. | 380/49 |
| 6,047,376 A | 4/2000 | Hosoe | 713/201 |
| 6,092,196 A | 7/2000 | Reiche | 713/200 |
| 6,141,687 A | 10/2000 | Blair | 709/225 |
| 6,324,584 B1 * | 11/2001 | Mandalia | |
| 6,516,351 B1 * | 2/2003 | Borr | 709/229 |
| 6,625,603 B1 * | 9/2003 | Garg et al. | 707/9 |

OTHER PUBLICATIONS

Bellare et al., "Keying Hash Functions for Message Authentication", 1996, Advances in Cryptology-Crypto 96 Proceedings, Lecture Notes in Computer Science, vol. 1109, N. Koblitz ed., Springer-Verlag.

Bellovin, Steven M., "Problem Areas for the IP Security Protocols", Jul. 22-25, 1996, Proceedings of the Sixth Usenix UNIX Security Symposium, San Jose, CA.

Cisco User Contol Point, pp. 1-4, printed from http://www.cisco.com/warp.public/728/ucp/ucp ds.htm on Sep. 10, 1998.

IPSec Network Security, pp. 1-69, printed from http://www.cisco.com/univercd/cc/td/doc/products/software/ios113ed/113t/113t 3/ipsec.

Krawczyk, Hugo, "SKEME: A Versalite Secure Key Exchange Mechanism for Internet", 1996, IEEE, Proceedings of the 1996 Symposium on Network and Distributed Systems Secutrity.

Patel, B., et al., "Securing L2TP using IPSEC", May 1998, PPPEXT Working Group, pp. 1-10, printed from http://www.masinter.net/~l2tp/ftp/draft-ietf-pppext-l2tp-security-02.txt. on Sep. 21, 1998.

"Remote Access Network Security", Ascend Communications, Inc., printed from http://www.ascend.com/1103.html, on Jul. 24, 1998, pp. 1-8.

Rigney, et al., "Remote Authentication Dial In User Service (RADIUS)", Network Working Group, RFC 2138, Apr. 1997, pp. 1-57.

* cited by examiner

METHOD AND APPARATUS FOR SECURING INFORMATION ACCESS

BACKGROUND OF THE INVENTION

1. Field of the Invention

The present invention relates to file security. More particularly, the present invention relates to a method and apparatus for protecting and accessing secure files that are stored on a file system. Among other uses, the invention may be used to protect files stored on routers which are generally accessible over the Internet.

2. Background

A number of mechanisms have been deployed to address the issue of file security on a file system. Security mechanisms often involve a user name and corresponding password that identifies the sender or client. A database is used to verify the password and provide the user with specific pre-authorized privileges.

Such password schemes are common on Internet servers storing secure information. A typical scheme acts as a gatekeeper, requiring a client to be positively identified before being allowed to access secure server files.

Routers are a vital part of the Internet. In general, routers are devices that receive packets of information via a data communications network input port and direct these packets of information through an output port. Routers are used to interconnect networks. For example, they may be used to interconnect local area networks (LANs) to wide area networks such as the Internet. In this capacity, they accept Internet packets destined for the LAN and also direct packets generated within the LAN to the Internet.

Routers also function as servers, receiving requests from clients or processes and responding to those requests. Therefore, routers are programmed with routines for appropriately responding to a variety of requests. These routines are referred to herein as request handlers.

One of the functions of routers is implementing network security. As the interface between a LAN and the Internet, routers may serve as the means of encrypting outgoing packets and decrypting incoming packets. Therefore, they often store files containing crucial and highly confidential information relating to security. Such files may include cryptographic keys. It is important that only authorized clients are able to access such crucial information.

Security on Internet routers is a new and evolving area. While a router connecting a LAN to the Internet must be generally accessible via the Internet, it may be desirable that the router be involved in encrypting and decrypting messages as they exit and enter the LAN. Thus, highly confidential cryptographic keys may be stored as files in the memory of a router. The need to devise methods and devices to protect these confidential files has recently become apparent. This invention addresses this newly recognized need.

BRIEF DESCRIPTION OF THE INVENTION

A method and apparatus for data communications network server file security is provided, wherein the apparatus positively verifies the identity of a client before allowing the client access to files containing confidential information.

Two essential functions need to be provided for access of secured files. First, a qualified client should be able to perform operations such as writing or editing. Second, a qualified client should be able to delete such a file. The invention provides a method and apparatus for performing these essential functions.

The invention employs a scheme for storing status types and values associated with a file. These status types and values may be stored as single bits. The status types and values indicate what operations are currently allowed on the file. A first memory location stores a fixed file security status associated with a file. This memory location stores a type used to indicate whether the file is a secure file or a non-secure file. This type remains unchangeable as long as the file exists and is used both to copy the security status to a second memory location and to determine whether or not file deletions are allowed atomically. Only for non-secure files is atomic deletion allowed.

A second memory location is created at the time a client sends a call to open the file. This memory location is part of a file entry which is uniquely created for each client request to open a file. This second memory location stores an active file security status containing a type copied from the fixed file security status stored in the first memory location. This active file security status type is changeable and is used to determine whether or not the client has the privilege to perform operations on the file. The active file security status type for a non-secure file is initialized to indicate that operations on the file are allowed. Therefore, every client has the privilege to perform operations on the file. For secured files, the active security status is initialized to a type indicating "operations not allowed" by copying it from the fixed file security status. To perform operations on a secure file, the active security status must be changed to a type indicating "operations allowed". This is accomplished by the client sending a authorization credential to the apparatus and the apparatus verifying that the client has the privilege to access the file. At that point, the active file security status type is changed and the client is allowed to perform operations on the file.

Since atomic deletion of secured files is not allowed, a third memory location is used to perform the operation of deleting a secured file. This memory location is also part of the file entry and is initialized to a value indicating "do not delete on close" for both secure and non-secure files. The value stored at this location is referred to as the delete-on-close status. To delete a secure file, the client must first gain access to the file by passing a authorization credential and subsequently having the active file security status type changed to "operations allowed". Then, the client sends a request to change the delete-on-close status to a type indicating "delete on close". The delete-on-close status is changed and the file is deleted when it is closed.

The invention may include a fourth memory location as a part of the file entry. This fourth memory is initialized upon creation of the file entry to contain the value of the fixed file security status. This fourth memory location remains unchanged throughout the existence of the file entry and may be used to conveniently access the type of the fixed file security status even after the active file security status type has been changed. This is useful if a secure file is being lengthened to extend over additional blocks in memory and it is desired that the fixed file security status be included in the block header.

A method for creating secured files is also provided. The method starts with a client making a call to the file server to open a file to write to the file. The file opened for write does not exist on the server at the time of the call. Upon receipt of the call, the server creates a file entry and returns a file descriptor while recognizing that this is a new file. The client passes a authorization credential to the user. If the client is authorized to create a new secure file, the user is allowed to proceed. The combination of the open new file to write call and the authorized authorization credential causes the server to recognize that the new file is to be a secure file. Therefore, the server then sets the fixed file security status associated with the new file to indicate that the file is secure, and closes all open file entries for the new file. Thereafter, any subsequent file open requires authentication before reading, modifying, writing or deleting the file.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

Figure 1:
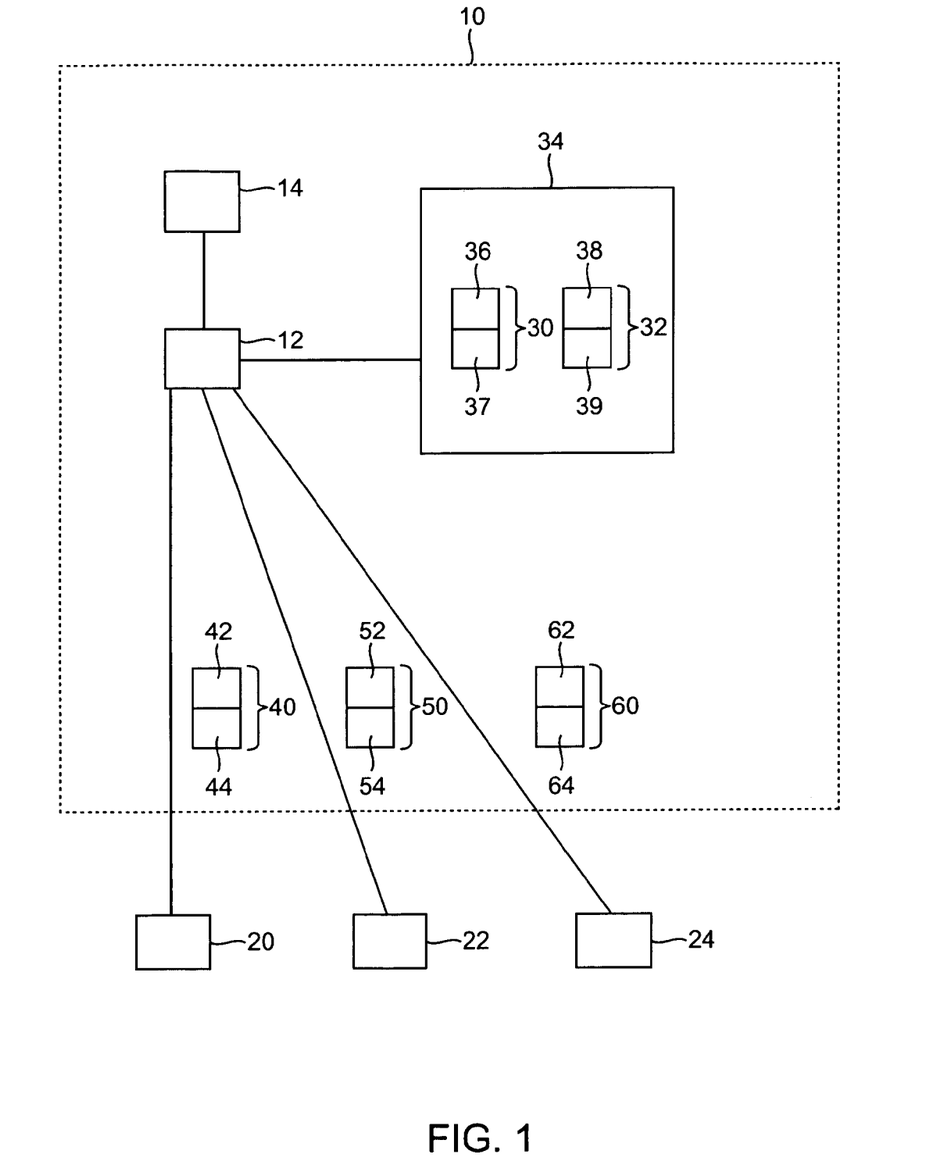
FIG. 1 is a block diagram showing a client, the apparatus, and the paths of communication between the client and the apparatus and between the components within the apparatus in accordance with a presently preferred embodiment of the invention.

Referring to FIG. 1, there is shown a block diagram of an apparatus 10 employing a server 12 as an interface between clients 20, 22, 24 and files 30, 32 stored in non-volatile random-access memory (NVRAM) 34. Though NVRAM is used in a preferred embodiment, other file media may be used. The server has capabilities for handling numerous clients concurrently and has routines for manipulating files according to client requests. Such routines include those to open, close, read, write, and delete files.

The NVRAM 34 contains files 30, 32, including at least one secure file 32. Each file stored on NVRAM has associated with it a memory location in NVRAM for storing a fixed file security status. Non-secure file 30 is associated with memory location 36, which stores a fixed file security status of a type corresponding to "operations allowed" or an equivalent status. File 30 also includes a content 37. Secure file 32 is associated with memory location 38, which stores a fixed file security status of a type corresponding to "operations not allowed". Secure file 32 includes a content 39, which may comprise a cryptographic key.

Upon a client 20 sending a request to the server 12 to open non-secure file 30, the server communicates with the NVRAM and creates a data structure 40 (a "file entry") in RAM. The data structure contains memory location 42 to store an active file security status and memory location 44 to store a delete-on-close status. A server routine reads memory location 36 and copies the contents of that location into a memory location 42 in file entry 40. Because memory location 30 contains a fixed file security status indicating the type "operations allowed" or an equivalent status, the type "operations allowed" will be copied to memory location 42.

At the same time, the server initializes memory location 44 with a value corresponding to "do not delete on close" or an equivalent status to indicate the delete-on-close status.

The server routine is generally the same in response to all calls to open a file. The server creates a file entry, stores the fixed file security status from the NVRAM file into a memory location in the file entry, and initializes the delete-on-close status in a memory location of the file entry to "do not delete on close". Each file entry can only be accessed by the client who made the request to open the file associated with the creation of that file entry. If multiple clients concurrently request to open the same file, an independent file entry will be created for each client. Upon close of a file the file entry is destroyed. However, unless an effective delete request is communicated to the server, as described below, the file and its associated fixed file security status will be retained in NVRAM.

In a preferred embodiment, the server routine may differentiate between open calls to read a file without changing its contents and open calls that will result in alterations to the contents. Because multiple clients may simultaneously access a file, it is desirable that clients who will alter a file be given exclusive access. In this embodiment open calls for writing or deleting a file will provide the client with exclusive access to the file.

Server routines that perform operations on a file, such as read and write, are designed to first determine the active file security status in the file entry associated with the file before an operation is performed. If the active file security status in the file entry indicates "operations allowed", the operation is performed. If the active file security status in the file entry indicates "operations not allowed", the operation is not performed and an error message is returned to the client. In the case of operations requested for file 30, after opening the file read and write operations would be performed upon request since the active file security status in the file entry would indicate "operations allowed".

Upon client 22 sending a request to the server 12 to open secure file 32, the server communicates with the NVRAM 34 and then creates a file entry 50 in RAM. The file entry contains memory location 52 to store the active file security status and memory location 54 to store a delete-on-close status. A server routine reads memory location 38 and copies the contents of that location into a memory location 52 in file entry 50. Because memory location 38 contains a fixed file security status of type "operations not allowed", type "operations not allowed" will be copied to memory location 52. At the same time, the server initializes memory location 54 with a value corresponding to "do not delete on close" to indicate the delete-on-close status.

While the active file security status in the file entry indicates "operations not allowed", operations requested by the client will not be performed on the file by the server. For an authorized client 22 to perform further operations on a secure file 32, the client 22 must open the file as described, whereupon the file entry 50 is created. The client must also communicate an authorization credential to the server 12. The server 12 passes the authorization credential and an identification of the file to the independent verification routine 14, which determines whether or not the client 22 is authorized to access the file. The independent verification routine then passes the result of the determination to the server 12. When the independent verification routine 14 positively validates the authorization of the client 22, the server changes the active file security status 52 to type "operations allowed", whereupon the client 22 is allowed to perform further operations on the file 32. Unless the validation procedure is successfully completed, the active file security status will remain unchanged.

The independent verification routine is a routine which has access to a database listing clients' authorization credentials and their corresponding privileges to perform operations on secure files. Preferably, the database is contained within the apparatus. Authorization credentials are passwords. In a preferred embodiment, a independent verification routine separate from the kernel handles the routine of verifying the privilege of a client.

As stated previously, the file entry is destroyed upon a client closing a file. However, since the file and its associated fixed security status are retained in NVRAM unless the file is deleted, a file may be accessed repeatedly using the same methods and apparatus of the invention.

In accordance with the present invention, deleting a secure file may not be an atomic operation because it would be undesirable to allow clients the ability to delete a secure file unless the client was authorized to do so. Delete operations must be able to differentiate between files that should be able to be deleted (non-secure files and secure files being deleted by an authorized client) and those that should not be able to be deleted (secure files attempted to be deleted by an unauthorized client). Therefore, the atomic delete operation must be designed to check the fixed file security status of a file before deleting it. Only files with an associated fixed file security status of type "operations allowed" will be deleted atomically. A new apparatus and method has been developed for the deletion of a secure file.

The new file deletion method employs a memory location in the file entry called delete-on-close which stores a value corresponding to either "delete on close" or "do not delete on close". When a file entry is created upon a client request to open a file, the delete-on-close memory location is created and initialized to value "do not delete on close". When delete-on-close indicates value "do not delete on close", the file is retained in NVRAM upon close of the file by the client. When delete-on-close indicates value "delete on close", the file is deleted from NVRAM upon close of the file by the client.

To change delete-on-close from value "do not delete on close" to value "delete on close", a client 24 requests to open secure file 32. At this point, the server may grant the client exclusive access to the file if the client requests it. A file entry 60 is created, type "operations not allowed" is copied from the fixed security status in memory location 38 to the active file security status in memory location 62, and delete-on-close is initialized to value "do not delete on close" in memory location 64. An authorized credential is passed from the client 24 to the independent verification routine 14. Upon successful validation, the active file security status 62 is changed to access type "operations allowed". A set delete-on-close request is made by the client 24. The server 12 then checks the active file security status 62 in the file entry 60. The server then changes the delete-on-close status in memory location 64 to "delete on close". Then, upon closing, the file 32 is deleted.

The set delete-on-close request may also be used to delete non-secure files, though the atomic delete operation is available and easier. However, there is no need for validation in this case.

In a preferred embodiment, the memory location for storing the fixed file security status is an NVRAM also containing the associated file.

In another preferred embodiment, the fixed file security status, the active file security status, and the delete-on-close status are stored as single bits.

It will be apparent to those skilled in the art that the server routines and the independent verification routine routines may be implemented in several ways. For example, all the routines of the server and independent verification routine may be included in the kernel of the apparatus. In a preferred embodiment, the independent verification routine routines will be separated from the kernel. This preferred implementation allows non-secure file to be accessed even when a independent verification routine is not present.

Figure 2:
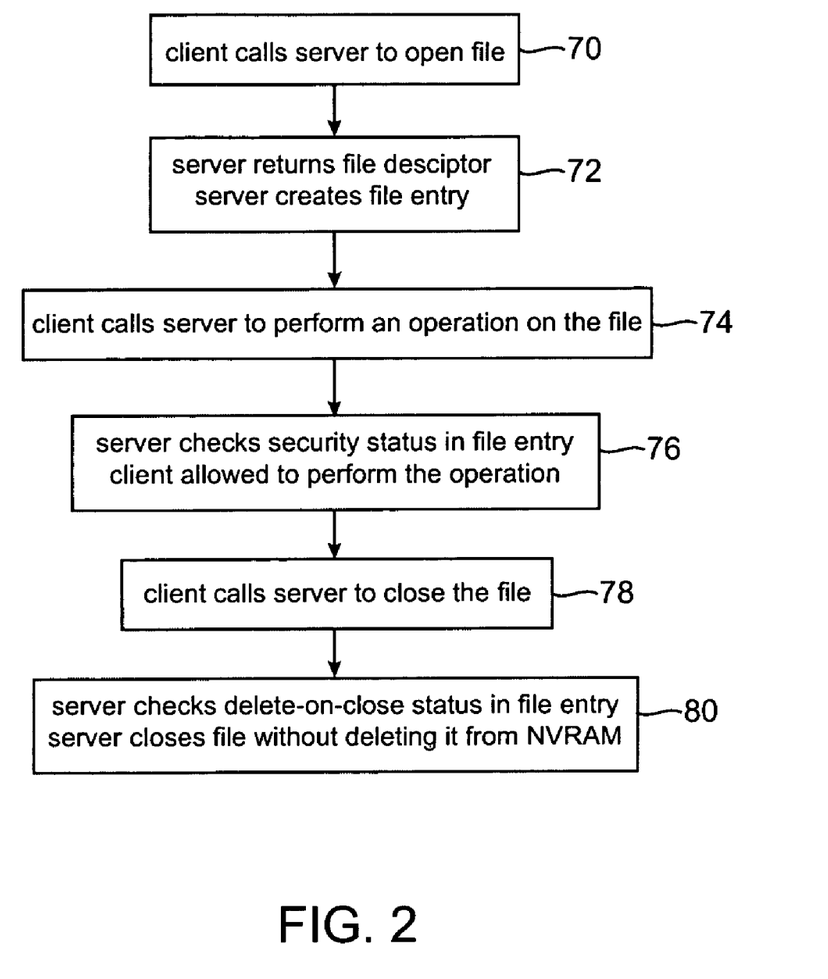
FIG. 2 is a flow diagram of a client accessing a non-secure file in accordance with a presently preferred embodiment of the invention.

FIG. 2 describes the process of a client accessing a non-secure file. First, the client calls the server to open the non-secure file 70. As discussed, if the client intends to alter the file, the client may request exclusive access. Next the server returns a file descriptor to the client and creates a file entry 72. The file entry will contain an active file security status of type "operations allowed" and a delete-on-close status of value "do not delete on close". Next, the client calls the server to perform an operation on the file 74. After receiving the request, the server checks the active security status type and allows the client to perform the operation 76 because the active file security status is of type "operations allowed". Once the operation is complete, the client calls the server to close the file 78. Finally, the server checks the delete-on-close status in the file entry and closes the file without deleting the file from NVRAM 80 because the delete-on-close value is "do not delete on close".

Figure 3:
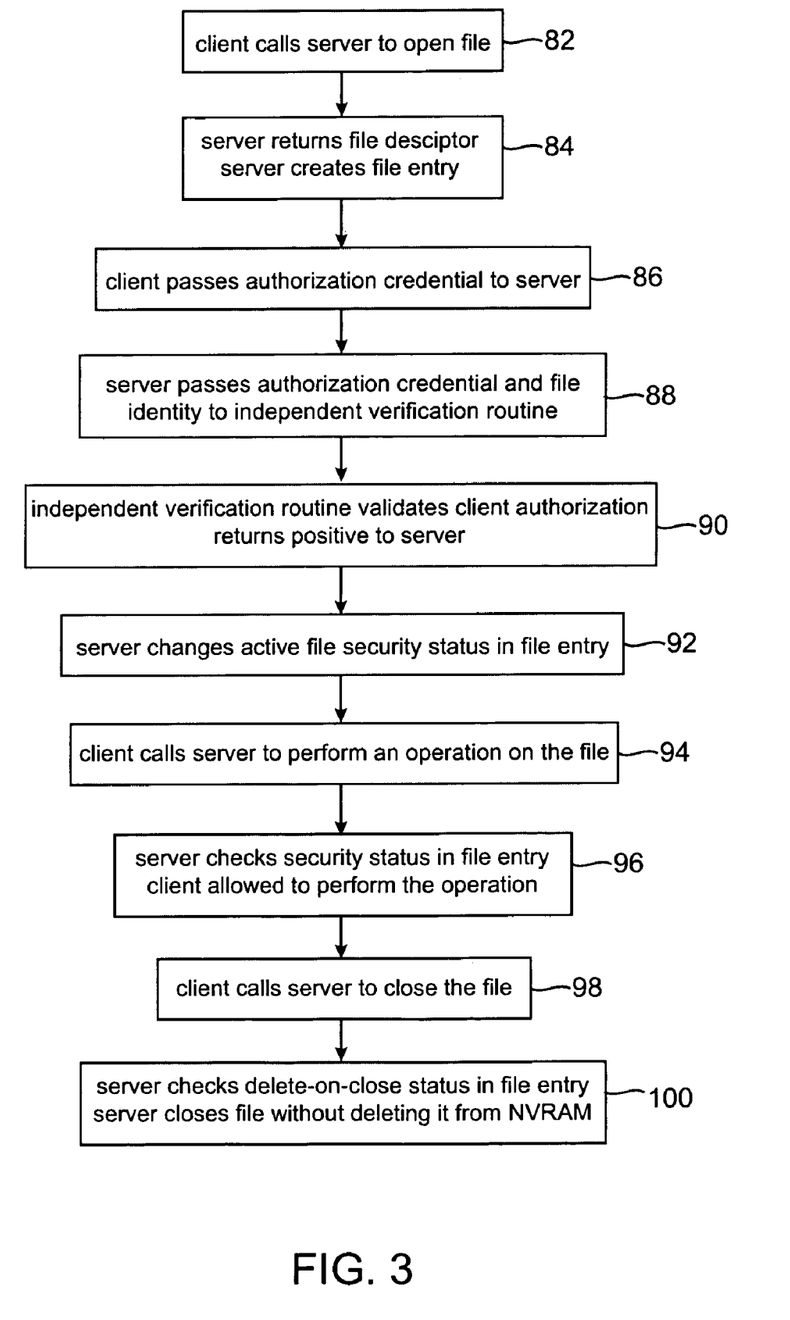
FIG. 3 is a flow diagram of a client accessing a secure file in accordance with a presently preferred embodiment of the invention.

FIG. 3 describes the process of a client accessing a secure file. As before, the client first calls the server to open the non-secure file 82 and the server returns a file descriptor to the client and creates a file entry 84. The file may be opened for exclusive access. The file entry will contain an active file security status of type "operations not allowed" and a delete-on-close status of value "do not delete on close". Now, the client must pass a authorization credential to the server 86. The authorization credential is then passed to the independent verification routine, accompanied by identification of the file 88. The independent verification routine then validates the client's privilege and returns this information to the server 90. With validation complete, the server changes the active file security status from type "operations not allowed" to type "operations allowed" 92. Next, the client calls the server to perform an operation on the file 94. After receiving the request, the server checks the active security status type and allows the client to perform the operation 96 because the active file security status is now of type "operations allowed". Once the operation is complete, the client calls the server to close the file 98. Finally, the server checks the delete-on-close status in the file entry and closes the file without deleting the file from NVRAM 100 because the delete-on-close value is "do not delete on close".

Figure 4:
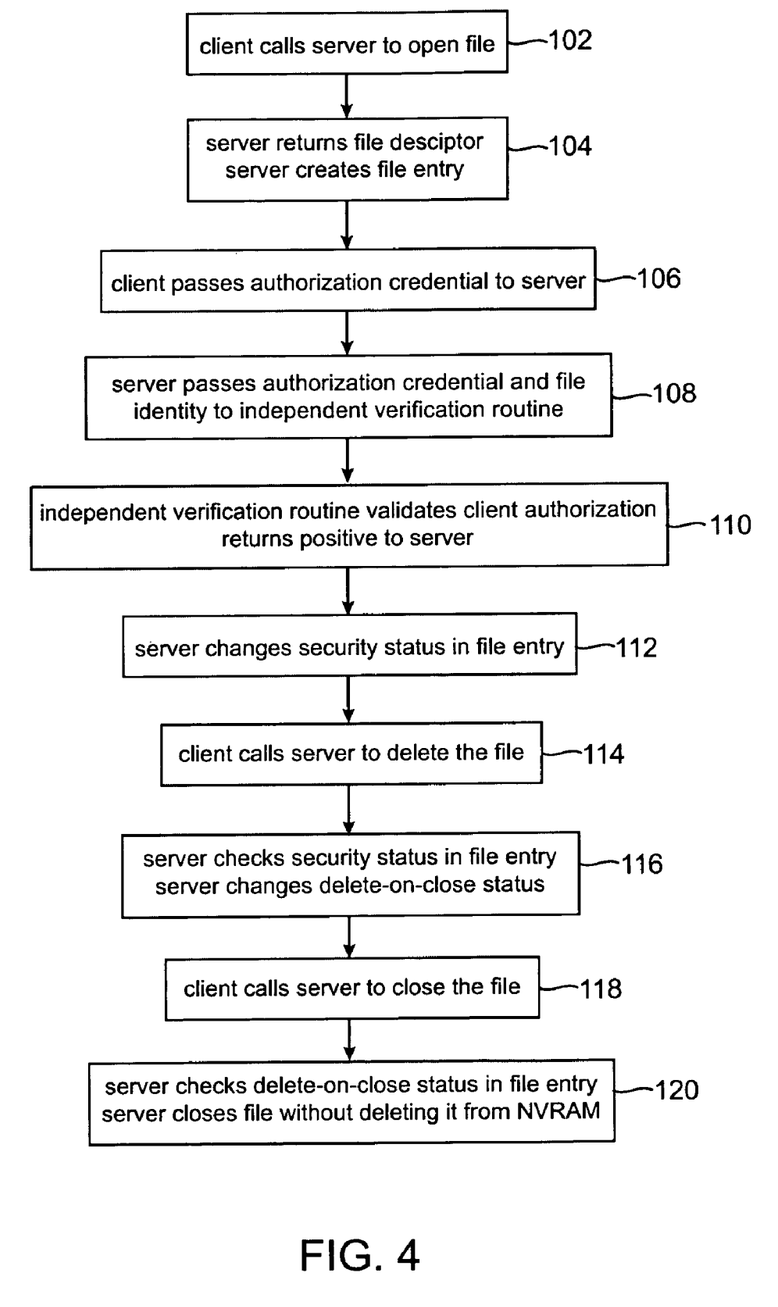
FIG. 4 is a flow diagram of a client deleting a secure file in accordance with a presently preferred embodiment of the invention.

FIG. 4 describes the process of a client deleting a secure file. As with the previous examples, the client first calls the server to open the non-secure file 102 and the server returns a file descriptor to the client and creates a file entry 104. The file may be opened for exclusive access. In this case, the file entry will contain an active file security status of type "operations not allowed" and a delete-on-close status of value "do not delete on close". Now, the client must pass a authorization credential to the server 106. The authorization credential is then passed to the independent verification routine, accompanied by identification of the file 108. The independent verification routine then validates the client's privilege and returns this information to the server 110. With validation complete, the server changes the active file security status from type "operations not allowed" to type "operations allowed" 112. Next, the client calls the server to set the delete-on-close value to "delete on close" 114. After receiving the request, the server checks the active security status type and then changes the delete-on-close value to "delete on close" 116 because the active file security status is now of type "operations allowed". The client then calls the server to close the file 118. The server checks the delete-on-close status in the file entry and closes the file without deleting the file from NVRAM 120 because the delete-on-close type is "delete on close".

Figure 5:
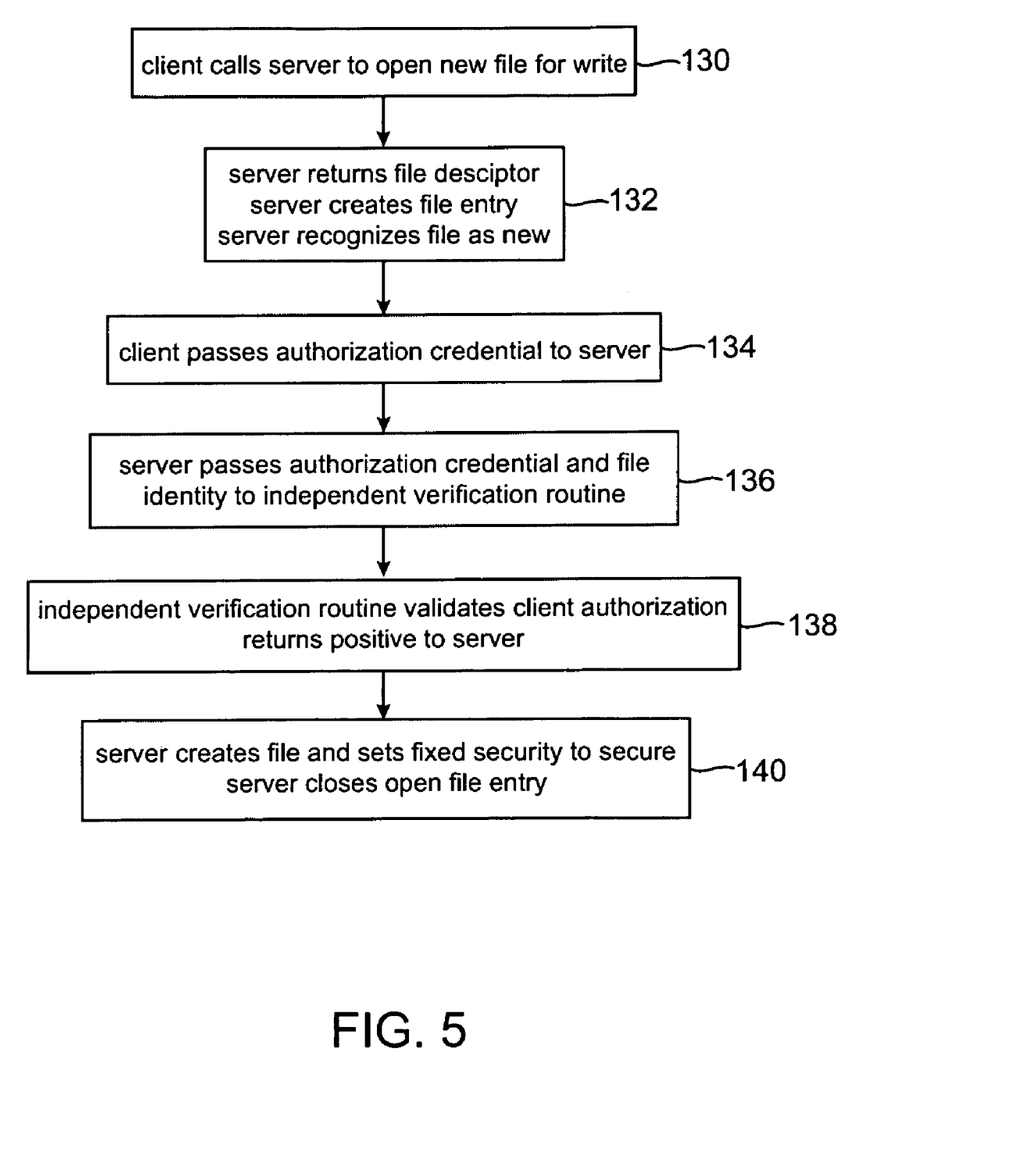
FIG. 5 is a flow diagram of a client creating a new secure file in accordance with a presently preferred embodiment of the invention.

FIG. 5 describes the process of creating a new secure file. The process begins with a client calling the server to open a new file for write 130. Thereupon, the server creates a file entry and returns a file descriptor to the client while recognizing that the file is new 132. The client then passes a authorization credential to the server 134. The server passes the authorization credential to the independent verification routine 136 where a check is made to determine if the client is authorized to create new secure files. Upon a positive determination, the independent verification routine returns this information to the server 138. Recognizing the combination of the request to open a new file for write and an authenticated authorization credential, a server routine creates a new file with the associated fixed file security status set to indicate that the file is secure, and closes any open file entries for the file 140. Thereafter, any call to open the file will require authentication of the client's authorization credential se before the client is allowed to perform operations on the file.

This invention can be implemented by using a program storage apparatus readable by machine, tangibly embodying a program of instructions executable by the machine.

There are numerous advantages to this invention.

Operations on non-secure files need not be affected by the method and apparatus of this invention. The fixed file security status type always indicates "operations allowed" for them, so these files can be manipulated and deleted as the client usually does. These clients are not affected in any way due to the inclusion of provisions for secured files.

When the process of verifying the identity of a client is shifted to a policy manger, the complexity of the kernel is minimized. If the independent verification routine fails, the kernel can operate as usual except that clients cannot access secure files. Non-secure files can still be manipulated by the clients, since the independent verification routine is not involved in that case.

All of the steps involved in opening and deleting files are independent of each other and are standard system calls already provided by the kernel. The calls are obtained from existing POSIX API standards. These programs may be packages into library routines thus simplifying the user level programming interface.

While embodiments and applications of this invention have been shown and described, after a review of this disclosure it would be apparent to those skilled in the art that many more modifications than mentioned above are possible without departing from the inventive concepts herein. The invention, therefore, is not to be restricted except in the spirit of the appended claims.

What is claimed is:

1. An apparatus for controlling operations by a client on a file stored on a network device, said apparatus comprising:
    a first memory associated with the file, said first memory for storing a fixed file security status, said fixed file security status being either of a first type or of a second type, wherein said first type indicates that operations are not allowed on the file and said second type indicates that operations are allowed on the file;
    a second memory associated with the file, said second memory for storing an active file security status, said active file security status being either of said first type or of said second type and changeable from said first type to said second type;
    an independent verification routine having access to a security database listing clients and corresponding privileges, wherein said independent verification routine is enabled:
        to determine whether the client has privilege to perform operations on the file based at least in part on an authorization credential from the client and
        to generate either a positive or a negative determination upon request; and
    a request handler in communication with said first memory, said second memory, and said independent verification routine, wherein said request handler is enabled:
        to receive a request from the client to open the file;
        to transmit a file descriptor to the client;
        to copy said fixed file security status from said first memory to said second memory as said active file security status;
        to determine whether said active file security status is of said first type or of said second type;
        when said active file security status is determined to be of said second type:
            to receive a request from the client to perform an operation on the file;
            to determine that said active file security status is of said second type; and
            to perform the operation requested by the client on the file;
        and
        when said active file security status is determined to be of said first type:
            to receive said authorization credential from the client;
            to pass said authorization credential to said independent verification routine;
            to receive a positive determination from said independent verification routine that the client has privilege to perform operations on the file;
            to change said active file security status from said first type to said second type;
            to receive a request from the client to perform an operation on the file;
            to determine that said active file security status is of said second type; and
            to perform the operation requested by the client on the file.

2. The apparatus of claim 1, further comprising a third memory associated with the file, said third memory for storing a delete-on-close status, said delete-on-close status initially set to a first value and changeable to a second value, wherein said first value indicates that the file will not be deleted upon closing and the second value indicates that the file will be deleted upon closing.

3. The apparatus of claim 2, wherein said first memory is a non-volatile random-access memory and said second memory and third memory are in a file entry.

4. The apparatus of claim 3, wherein said first memory, said second memory, and said third memory comprise single bits.

5. A method for controlling operations by a client on a file stored on a network device having a first memory associated with the file and a second memory associated with the file, wherein the first memory stores a fixed file security status being either of a first type or of a second type and the second memory stores an active file security status being either of the first type or of the second type and changeable from the first type to the second type and wherein the first type indicates that operations are not allowed on the file and the second type indicates that operations are allowed on the file, the method comprising:
receiving a request from the client to open the file;
transmitting a file descriptor to the client;
copying the fixed file security status from the first memory to the second memory as the active file security status;
determining whether the active file security status is of the first type or of the second type;
when the active file security status is determined to be of the second type:
receiving a request from the client to perform an operation on the file;
determining that the active file security status is of the second type; and
performing the requested by the client on the file;
and
when the active file security status is determined to be of the first type:
receiving an authorization credential from the client;
passing the authorization credential to an independent verification routine that determines whether the client has privilege to perform operations on the file;
receiving a positive determination from the independent verification routine that the client has privilege to perform operations on the file;
changing the active file security status from the first type to the second type;
receiving a request from the client to perform an operation on the file;
determining that the active file security status is of the second type; and
performing the operation requested by the client on the file.

6. The method as defined in claim 5, wherein when the active file security status is determined to be of the first type and before changing the active file security status, the method further comprises:
receiving a request from the client to perform an operation on the file; and
returning an error message to the client indicating a refusal to perform the operation requested by the client on the file.

7. The method as defined in claim 6, wherein when the active file security status is determined to be of the first type and after passing the authorization credential, the method further comprises:
receiving a negative determination from the independent verification routine that the client has no privilege to perform operations on the file;
receiving a request from the client to perform an operation on the file; and
returning an error message to the client indicating a refusal to perform the operation requested by the client on the file.

8. An apparatus for controlling operations by a client on a file stored on a network device having a first memory associated with the file and a second memory associated with the file, wherein the first memory stores a fixed file security status being either of a first type or of a second type and the second memory stores an active file security status being either of the first type or of the second type and changeable from the first type to the second type and wherein the first type indicates that operations are not allowed on the file and the second type indicates that operations are allowed on the file, the apparatus comprising:
means for receiving a request from the client to open the file;
means for transmitting a file descriptor to the client;
means for copying the fixed file security status from the first memory to the second memory as the active file security status;
means for determining whether the active file security status is of the first type or of the second type;
when the active file security status is determined to be of the second type:
means for receiving a request from the client to perform an operation on the file;
means for determining that the active file security status is of the second type; and
means for performing the operation requested by the client on the file;
and
when the active file security status is determined to be of the first type:
means for receiving an authorization credential from the client;
means for passing the authorization credential to an independent verification routine that determines whether the client has privilege to perform operations on the file;
means for receiving a positive determination from the independent verification routine that the client has privilege to perform operations on the file;
means for changing the active file security status from the first type to the second type;
means for receiving a request from the client to perform an operation on the file;
means for determining that the active file security status is of the second type; and
means for performing the operation requested by the client on the file.

9. The apparatus as defined in claim 8, wherein when the active file security status is determined to be of the first type and before the active file security status has been changed, the apparatus further comprises:
means for receiving a request from the client to perform an operation on the file; and
means for returning an error message to the client indicating a refusal to perform the operation requested by the client on the file.

10. The apparatus as defined in claim 8, wherein when the active file security status is determined to be of the first type and after the authorization credential has been passed, the apparatus further comprises:
means for receiving a negative determination from the independent verification routine that the client has no privilege to perform operations on the file;
means for receiving a request from the client to perform an operation on the file; and
means for returning an error message to the client indicating a refusal to perform the operation requested by the client on the file.

11. A computer-readable medium having stored thereon computer-executable instructions for performing a method for controlling operations by a client on a file stored on a network device having a first memory associated with the file and a second memory associated with the file, wherein the first memory stores a fixed file security status being either of a first type or of a second type and the second memory stores an active file security status being either of the first type or of the second type and changeable from the first type to the second type and wherein the first type indicates that operations are not allowed on the file and the second type indicates that operations are allowed on the file, the method comprising:

receiving a request from the client to open the file;

transmitting a file descriptor to the client;

copying the fixed file security status from the first memory to the second memory as the active file security status;

determining whether the active file security status is of the first type or of the second type;

when the active file security status is determined to be of the second type:

receiving a request from the client to perform an operation on the file;

determining that the active file security status is of the second type; and         performing the operation requested by the client on the file;

and when the active file security status is determined to be of the first type:

receiving an authorization credential from the client;

passing the authorization credential to an independent verification routine that determines whether the client has privilege to perform operations on the file;

receiving a positive determination from the independent verification routine that the client has privilege to perform operations on the file;

changing the active file security status from the first type to the second type;

receiving a request from the client to perform an operation on the file;

determining that the active file security status is of the second type; and         performing the operation requested by the client on the file.

12. The computer-readable medium as defined in claim 11, wherein when the active file security status is determined to be of the first type and before changing the active file security status, the method further comprises:

receiving a request from the client to perform an operation on the file; and     returning an error message to the client indicating a refusal to perform the operation requested by the client on the file.

13. The computer-readable medium as defined in claim 11, wherein when the active file security status is determined to be of the first type and after passing the authorization credential, the method further comprises:

receiving a negative determination from the independent verification routine that the client has no privilege to perform operations on the file;

receiving a request from the client to perform an operation on the file; and     returning an error message to the client indicating a refusal to perform the operation requested by the client on the file.

* * * * *